United States Patent Office 3,594,444
Patented July 20, 1971

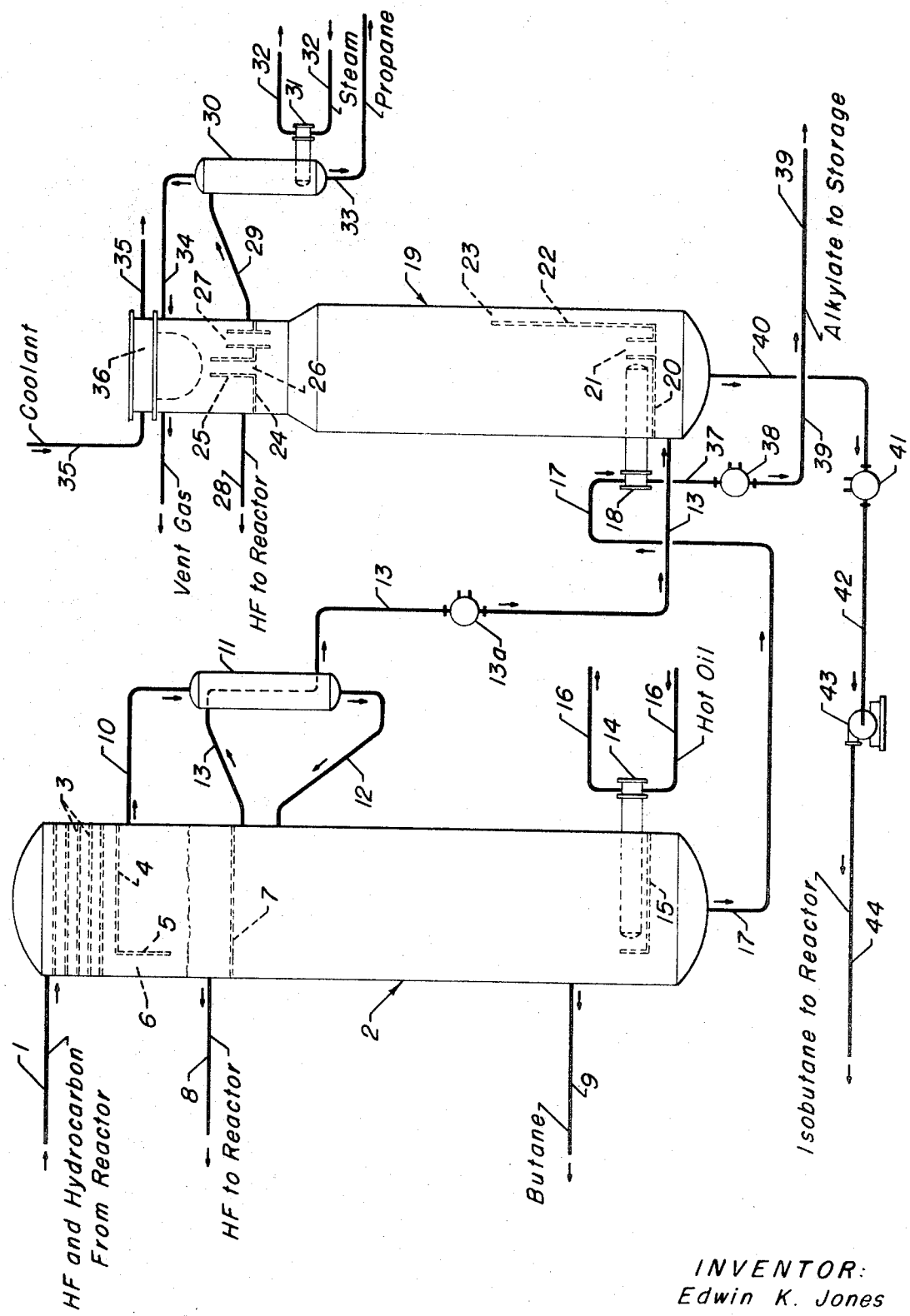

3,594,444
PROCESS FOR SEPARATING HYDROCARBONS AND HYDROGEN FLUORIDE CATALYST FROM THE EFFLUENT OF AN ISOPARAFFIN-OLEFIN ALKYLATION REACTION ZONE
Edwin K. Jones, Kenilworth, Ill., assignor to Universal Oil Products Company, Des Plaines, Ill.
Filed June 9, 1969, Ser. No. 831,618
Int. Cl. C07c 3/54; B01d 3/00
U.S. Cl. 260—683.48                6 Claims

ABSTRACT OF THE DISCLOSURE

Process for separating hydrocarbons and hydrogen fluoride catalyst from the total hydrogen fluoride-hydrocarbon effluent of an isoparaffin-olefin alkylation reaction zone in a processing system wherein a vapor fraction comprising propane and isoparaffinic hydrocarbons is partially condensed in an external heat exchanger means utilizing hydrocarbon separated in a first separation zone as the medium for indirect heat exchange and wherein the desired alkylated fraction is passed to second separation zone reboiler means as the sole source of heat to this reboiler prior to recovery.

BACKGROUND OF THE INVENTION

The invention relates to a process for separating hydrocarbons and hydrogen fluoride catalyst. It particularly relates to a process for separating hydrocarbons and hydrogen fluoride catalyst from the total hydrogen fluoride-hydrocarbon effluent of an isoparaffin-olefin alkylation reaction zone.

It is well known in the prior art that catalytic alkylation utilizing sulfuric acid or hydrofluoric acid as the catalyst is an important chemical tool for preparing alkylated hydrocarbons and derivatives thereof. The commercial and industrial demand for these products is exemplified by the demand for isoparaffin hydrocarbons and alkyl-substituted benzenes of the gasoline boiling range and with the demand for alkyl-substituted aromatics suitable for conversion for surfactants, e.g., detergents, wetting agents, and the like.

The catalytic alkylation process to which the present invention is especially applicable consists of a process in which a mixture of hydrocarbons containing isoparaffins such as isobutane, isopentane, and the like, and olefins such as propylene, butylenes, isobutene, amylenes, and the like, are mixed intimately in the presence of a strong acid catalyst such as hydrofluoric acid for a time sufficient to complete the reaction. The effluent from the reaction zone contains isoparaffin hydrocarbons of higher molecular weight than the isoparaffins in the original mixture. Isobutane has been used almost exclusively because of its reactivity and availability to produce high quality alkylate products. Accordingly, for convenience, the term "alkylate" as used in the specification and claims is intended to embody the higher molecular weight reaction product from the alkylation reaction. In similar manner among the olefins, butenes have been used almost exclusively. Propylene and the pentents, and even higher boiling olefinic hydrocarbons, can be used according to their availability.

SUMMARY OF THE INVENTION

Accordingly, it is an object of this invention to provide a process for separating hydrocarbons and hydrogen fluoride catalyst from the total hydrogen fluoride-hydrocarbon effluent of an ispraffin-olefin alkylation reaction zone.

It is another object of this invention to provide a separation process in a more facile, economical and efficient manner in a particular environment which has presented peculiar and difficult problems.

Therefore, the present invention provides a process for separating hydrocarbons and hydrogen fluoride catalyst from the total hydrogen fluoride-hydrocarbon effluent of an isoparaffin-olefin alkylation reaction zone which comprises the steps of: (a) introducing the total hydrogen fluoride-hydrocarbon effluent from said reaction zone into an upper portion of a first separation zone maintained under separation conditions sufficient to separate said hydrogen fluoride catalyst from the hydrocarbon portion of said effluent; (b) withdrawing settled hydrogen fluoride catalyst from an intermediate portion of said first separation zone as an intermediate fraction; (c) partially condensing a hereinafter specified first vapor fraction in external heat exchanger means wherein the hydrocarbon portion of step (a) is withdrawn from said first separation zone, indirectly heat exchanged with said first vapor fraction, and returned directly to said first separation zone at a locus below the locus for withdrawing said first vapor fraction; (d) withdrawing a first vapor fraction comprising propane and isoparaffinic hydrocarbons at a locus below the locus for withdrawing said settled hydrogen fluoride catalyst; (e) withdrawing normal paraffinic hydrocarbon from said first separation zone; (f) withdrawing without intervening cooling alkylated hydrocarbons from a bottoms portion of said first separation zone as an alkylate fraction; (g) introducing said partially condensed fraction of step (c) into a second separation zone and passing said alkylate fraction of step (f) to reboiler means positioned in a lower portion of said second separation zone as the sole source of heat supplied to said reboiler means; (h) withdrawing isoparaffinic hydrocarbon from a bottom portion of said second separation zone and a propane-containing stream from an upper portion of said zone; and, (i) recovering the alkylate fraction passed to said reboiler means of step (g).

As will be described hereinafter in greater detail, the essence of my invention comprises utilizing a vapor fraction comprising propane and isoparaffin hydrocarbon that is partially condensed in an external heat exchanger zone utilizing the hydrocarbon portion of the effluent that has been separated in the first separation zone as the medium for indirect heat exchange and, in conjunction with this feature, the desired alkylate product fraction is passed without intervening cooling to a second separation zone reboiler means as the sole source of heat to this reboiler prior to subsequent recovery of the alkylate.

My invention can be more clearly described and illustrated with reference to the attached drawing which is a schematic representation of a preferred embodiment of my invention.

DESCRIPTION OF THE DRAWING

Referring now to the drawing, the total hydrogen fluoride-hydrocarbon effluent from an isoparaffin-olefin alkylation reaction zone (not shown) is introduced via line 1 into first separation zone 2 which is maintained under separation conditions sufficient to separate hydrogen fluoride catalyst from the hydrocarbon portion of the effluent. In a preferred embodiment, the first separation zone has contacting means 3 such as perforated plates, trays, baffles and the like disposed above horizontal partition 4. Horizontal partition 4 has weir means 5 extending downwardly from the partition to form vertical fluid passageway 6 between the upper and upper intermediate portions of the first separation zone. In the drawing, the numeral 7 represents a second horizontal partition upon which the settled hydrogen fluoride remains until it is withdrawn from the intermediate portion of the first separation zone via line 8 as an intermediate fraction.

The hydrocarbon portion of the total effluent is withdrawn from the first separation zone via line 10 and passed to external heat exchanger means 11 and returned directly to the first separation zone via line 12 at a locus below the locus for withdrawing a hereinafter described first vapor fraction. The first vapor fraction comprises propane and isoparaffin hydrocarbons and is withdrawn from the first separation zone via line 13 at a locus below the locus for withdrawing the settled hydrogen fluoride catalyst via line 8.

Normal paraffinic hydrocarbon is withdrawn, preferably, from a lower portion of the first separation zone, and is represented by the numeral 9.

The first separation zone has reboiler means 14 located in a bottom portion of the first separation zone and is disposed in well 15. A hot oil system represented by the numeral 16 supplies heat to this separation zone.

Alkylated hydrocarbons are withdrawn without intervening cooling via line 17 from a bottoms portion of the first separation zone and are passed to reboiler means 18 positioned in a lower portion of the second separation zone 19 as the sole source of heat supplied to reboiler means 18. Reboiler means 18 is disposed in well 20 with fluid passageway 21 formed by weir means 22 and well 20. The housing contains a vapor riser means 23 communicating with an intermediate portion of said housing and is formed by means 22 and the housing of the second separation zone.

The partially condensed vapor fraction comprising propane and isoparaffinic hydrocarbons is introduced, in a preferred embodiment, via line 13 and cooler 13a into a bottom portion of second separation zone 19.

The second separation zone makes the separation between the isoparaffinic hydrocarbon, propane and any dissolved hydrogen fluoride. Isoparaffinic hydrocarbon is withdrawn from a bottom portion of second separation zone 19 via line 40, passed through cooler 41 through line 42 via pump 43 and line 44 to provide, in a preferred mode of operation, isoparaffinic hydrocarbon recycle to the alkylation reaction zone.

The propane and hydrogen fluoride passes upwardly in second separation zone 19 through vapor riser 26 which is formed by horizontal partition means 24 and weir means 25 into an upper section of the second separation zone. Coolant via line 35 is supplied to cooling means 36 and a propane-containing stream is removed from the second separation zone via line 29 and passed to external stripping means 30 which has disposed therein reboiler 31 supplied by steam means 32. At least a portion of the propane is removed from stripping zone 30 via line 33 and the remainder along with hydrogen fluoride is recycled back to the second separation zone from stripping means 30 via line 34.

In a preferred embodiment, hydrogen fluoride catalyst may be withdrawn via line 28 from the second separation zone for recycle to the isoparaffin-olefin alkylation reaction zone. Vent gas, if any, may be removed from the upper portion of the second separation zone. Reflux comprising propane and dissolved hydrogen fluoride is refluxed from an upper portion of the second separation zone by liquid downcomer means 27.

The desired alkylate fraction that was passed to reboiler means 18 by line 17 is recovered and sent to storage via line 37, cooler 38 and line 39.

As will be understood by one skilled in the art, the first separation zone operates so that the zone formed above horizontal partition means 4 is a settling zone to take advantage of the fact that the hydrogen fluoride alkylation catalyst is heavier than the hydrocarbon portion of the effluent so that the catalyst gravitates downwardly to partition 7 for removal via line 8 from the first separation zone. The remaining hydrocarbon containing only dissolved hydrogen fluoride passes via lines 10 and 12 into a lower portion of the first separation zone where the hydrocarbon is heated by reboiler 14. Normal butane vapors leave the separation zone via line 9 as a side-cut fraction and the desired heavier alkylate is removed via line 17. The vapors from the stripping section of the first separation zone then pass via line 13 and cooler 13a to the second separation zone where propane is separated from the isoparaffinic hydrocarbon. In the second separation zone, the propane and hydrogen fluoride vapors pass through vapor riser means 26 and are condensed by a water or refrigerated exchanger 36. The condensed hydrogen fluoride is gravitated into an acid settler section and removed via line 28 above partition 24. The propane is stripped of hydrogen fluoride in stripper means 30 and is then pressured to storage via line 33. A portion of the propane is recycled back into the second separation zone as reflux. The isoparaffinic hydrocarbon is separated as a liquid bottoms product and in a preferred embodiment is passed to the alkylation reactor.

PREFERRED EMBODIMENT

In a particularly preferred embodiment of my invention, this invention provides a process for separating hydrocarbons and hydrogen fluoride catalyst from the total hydrogen fluoride-hydrocarbon effluent of an isobutane-butene alkylation reaction zone which comprises the steps of: (a) introducing the total hydrogen fluoride-hydrocarbon effluent from said reaction zone into an upper portion of a first separation zone maintained under separation conditions sufficient to separate said hydrogen fluoride catalyst from the hydrocarbon portion of said effluent; (b) withdrawing settled hydrogen fluoride catalyst from an intermediate portion of said first separation zone as an intermediate fraction; (c) partially condensing a hereinafter specified first vapor fraction in external heat exchanger means wherein the hydrocarbon portion of step (a) is withdrawn from said first separation zone, indirectly heat exchanged with said first vapor fraction, and returned directly to said first separation zone at a locus below the locus for withdrawing said first vapor fraction; (d) withdrawing a first vapor fraction comprising propane and isobutane at a locus below the locus for withdrawing said settled hydrogen fluoride catalyst; (e) withdrawing normal butane from a lower portion of said first separation zone; (f) withdrawing, without intervening cooling, alkylated hydrocarbons from a bottoms portion of said first separation zone as an alkylate fraction; (g) introducing said partially condensed fraction of step (c) into a second separation zone and passing said alkylate fraction of step (f) to reboiler means positioned in a lower portion of said second separation zone as the sole source of heat supplied to said reboiler means; (h) withdrawing isobutane from a bottom portion of said second separation zone and a propane-containing stream from an upper portion of said zone; (i) passing said propane-containing stream to an external stripping zone wherein hydrogen fluoride is separated from said propane and recycled to said second separation zone; (j) withdrawing hydrogen fluoride from said second separation zone for recycle to said isobutane-butene alkylation reaction zone; and, (k) recovering the alkylate fraction passed to said reboiler means of step (g).

It is apparent that the present invention provides a process for separating hydrocarbons and hydrogen fluoride catalyst from the total hydrogen fluoride-hydrocarbon effluent of an isoparaffin-olefin alkylation reaction zone utilizing a simplified processing scheme and a more economical and efficient piping and heating system than previous prior art design.

I claim as my invention:

1. A process for separating hydrocarbons and hydrogen fluoride catalyst from the total hydrogen fluoride-hydrocarbon effluent of an isoparaffin-olefin alkylation reaction zone which comprises the steps of:

(a) separating said total effluent by gravity settling, in a separation zone superjacent to a hereinafter specified stripping zone, into a hydrogen fluoride phase and a hydrocarbon phase containing dissolved hydrogen fluoride;

(b) heating said hydrocarbon phase by indirect heat exchange with a hereinafter specified vapor fraction;

(c) introducing the resulting heated hydrocarbon phase as feed to the upper portion of a stripping zone;

(d) supplying reboiling heat to the lower portion of said stripping zone;

(e) withdrawing an alkylate fraction comprising alkylated hydrocarbons from the bottom portion of said stripping zone and passing said alkylate fraction, without intervening cooling, to the lower portion of a hereinafter specified fractionation zone as the reboiler heating medium therefor;

(f) withdrawing a vapor fraction comprising propane, isoparaffinic hydrocarbons and hydrogen fluoride from said stripping zone at a locus above the feed locus;

(g) partially condensing said vapor fraction by said indirect heat exchange with said hydrocarbon phase according to step (b);

(h) passing said partially condensed fraction of step (g) as feed to a fractionation zone maintained under fractionation conditions sufficient to provide an overhead stream comprising propane and hydrogen fluoride and a bottoms stream comprising isoparaffinic hydrocarbons;

(i) supplying the total amount of reboiling heat required for said fractionation zone to the lower portion thereof by indirect exchange with said alkylate fraction of step (e); and (j) recovering said alkylate fraction after abstracting heat therefrom according to step (i).

2. The process according to claim 1 wherein said isoparaffin-olefin alkylation reaction zone is processing isobutane and an olefin having from 3 to 5 carbon atoms per molecule.

3. The process according to claim 1 wherein said isoparaffin-olefin alkylation reaction zone is processing isobutane and a butene.

4. The process according to claim 1 wherein said settled hydrogen fluoride catalyst of step (a) is recycled to the isoparaffin-olefin alkylation reaction zone.

5. The process according to claim 1 wherein said isoparaffinic hydrocarbon of step (h) is recycled to the isoparaffin-olefin alkylation reaction zone.

6. The process according to claim 1 wherein said propane overhead stream of step (h) is passed to a second stripper zone wherein hydrogen fluoride is stripped from said propane.

References Cited

UNITED STATES PATENTS

| | | | |
|---|---|---|---|
| 3,073,877 | 1/1963 | Sherk | 260—683.48 |
| 3,254,137 | 5/1966 | Hutto et al. | 260—683.48 |
| 3,370,003 | 2/1968 | Borst, Jr. | 260—683.62 |
| 3,402,123 | 9/1968 | Coste | 260—683.62 |
| 3,431,079 | 3/1969 | Chapman | 260—683.48 |

DELBERT E. GANTZ, Primary Examiner

G. J. CRASANAKIS, Assistant Examiner

U.S. Cl. X.R.

208—351, 353, 354